(12) United States Patent
Sumiya et al.

(10) Patent No.: US 7,091,490 B2
(45) Date of Patent: Aug. 15, 2006

(54) DEPTH OF INTERACTION DETECTOR WITH UNIFORM PULSE-HEIGHT

(75) Inventors: Keiji Sumiya, Ibaraki (JP); Hiroyuki Ishibashi, Ibaraki (JP); Hideo Murayama, Chiba (JP); Naoko Inadama, Chiba (JP); Takaji Yamashita, Shizuoka (JP); Tomohide Omura, Shizuoka (JP)

(73) Assignees: Hitachi Chemical Co., Ltd., Tokyo (JP); National Institute of Radiological Sciences, Chiba (JP); Hamamatsu Photonics K.K., Hamakita (JP)

( * ) Notice: Subject to any disclaimer, the term of this patent is extended or adjusted under 35 U.S.C. 154(b) by 342 days.

(21) Appl. No.: 10/684,413

(22) Filed: Oct. 15, 2003

(65) Prior Publication Data

US 2005/0087693 A1    Apr. 28, 2005

(30) Foreign Application Priority Data

Oct. 15, 2002    (JP)    ............................. 2002-300125

(51) Int. Cl.
*G01T 1/20*    (2006.01)

(52) U.S. Cl. ................... 250/367; 250/368; 250/370.11

(58) Field of Classification Search ................ 250/367, 250/368, 370.1, 370.11
See application file for complete search history.

(56) References Cited

U.S. PATENT DOCUMENTS

| | | | |
|---|---|---|---|
| 4,037,105 A * | 7/1977 | Laurer | 250/367 |
| 4,511,799 A * | 4/1985 | Bjorkholm | 250/367 |
| 4,945,241 A | 7/1990 | Yamashita et al. | |
| 6,087,663 A * | 7/2000 | Moisan et al. | 250/367 |
| 6,288,399 B1 * | 9/2001 | Andreaco et al. | 250/368 |
| 6,362,479 B1 * | 3/2002 | Andreaco et al. | 250/366 |
| 6,448,559 B1 * | 9/2002 | Saoudi et al. | 250/367 |

FOREIGN PATENT DOCUMENTS

| | | |
|---|---|---|
| JP | 63-47686 | 2/1988 |
| JP | 1-229995 | 9/1989 |

(Continued)

OTHER PUBLICATIONS

S. Yamamoto, et al., "A GSO depth of interaction detector for PET", IEEE Transactions on Nuclear Science, vol. 45, No. 3, Jun. 1998, pp. 1078-1082.

(Continued)

*Primary Examiner*—Albert Gagliardi
(74) *Attorney, Agent, or Firm*—Antonelli, Terry, Stout and Kraus, LLP.

(57) ABSTRACT

A depth of interaction detector with uniform pulse-height comprises a multi-layer scintillator obtained by coupling at least two scintillator cells on a plane and then stacking the planar coupled scintillator cells, in layers, up to at least two stages and a light-receiving element connected to the bottom face of each scintillator cell of this multi-layer scintillator, wherein the detector is provided with a means for discriminating the position of a scintillator cell, which receives radiant rays and emits light rays and a means for making, uniform, the quantity of the light emitted from each scintillator cell and received by the light-receiving element. The detector can provide precise detection information even when radiation is absorbed by and emitted from a scintillator layer positioned above the scintillator layer optically coupled to the light-receiving element, permits the production of a depth of interaction detector having a three-dimensional depth of interaction-detecting function and can provide the same total output signal, which is independent of the position or a specific scintillator cell practically emitting light if the radiation energy is identical.

13 Claims, 8 Drawing Sheets

FOREIGN PATENT DOCUMENTS

| | | |
|---|---|---|
| JP | 11-142523 | 5/1999 |
| JP | 2000-56023 | 2/2000 |
| JP | 2003-21682 | 1/2003 |

OTHER PUBLICATIONS

C. Moisan, et al., "Segmented LSO Crystals for Depth-Of-Interaction Encoding in PET", IEEE Transactions on Nuclear Science, vol. 45, No. 6, Dec. 1998, pp. 3030-3035.

R. Miyaoka, et al., "Design of a Depth of Interaction (DOI) PET Detector Module", IEEE Transactions on Nuclear Science, vol. 45, No. 3, Jun. 1998, pp. 1069-1073.

Murayama, et al., "Design of a Depth of Interaction Detector with a PS-PMT for PET", IEEE Transactions on Nuclear Science, vol. 47, No. 3, Jun. 2000, pp. 1045-1050.

Murayama, et al. "Depth Encoding Multicrystal Detectors for PET", IEEE Transactions on Nuclear Science, vol. 45, No. 3, Jun. 1998, pp. 1152-1157.

Inodama, et al., "A Depth of Interaction Detector for PET With GSO Crystals Doped with Different Amounts of Ce", IEEE Transactions on Nuclear Science, vol. 49, No. 3, Jun. 2002, pp. 629-633.

* cited by examiner

DEPTH OF INTERACTION DETECTOR WITH UNIFORM PULSE-HEIGHT

BACKGROUND OF THE INVENTION

The present invention relates to a depth of interaction detector with uniform pulse-height, which is a scintillation radiation detector having a function of detecting radiation depth of interaction and a function of selecting radiation absorption energy imparted thereto.

Conventionally, there has been known a three-dimensional depth of interaction detector (see, for instance, Document 1 as will be given later) as a depth of interaction detector, which is a scintillation radiation detector having a function of detecting radiation depth of interaction and a function of selecting radiation absorption energy imparted thereto. In this detector, however, the conditions set for absorbed radiation energy may vary depending on every scintillation cell and they must thus be selected independently or individually. For this reason, this detector never has a structure in which radiation energies are selected through a circuit on the basis of the same selection conditions or the same signal-processing circuit. This not only complicates the structure of such a signal-processing circuit for a multi-layer scintillation block obtained by stacking up scintillator cells, but also suffers from a problem in that images thus obtained are non-uniform because the energy resolution capacity of the scintillator cells differ from one another. In other words, there is observed, for scintillator cells located far away from a light-receiving element, a decrease of the sum of output signals due to such stacking up of the scintillator layers and accordingly, the overall depth of interaction-detecting characteristics and energy-resolving characteristics of the device would be damaged.

FIG. 7 shows an example of a conventional depth of interaction detector and FIG. 8 shows the energy spectrum of energy distribution observed for each scintillator cell with respect to the total quantity of light rays received by the light-receiving element of the conventional depth of interaction detector (1) wherein the pulse-heights observed for a γ-ray of a single wavelength considerably differ from cell to cell (see, for instance, Document 2 as will be given later). Thus, the conventional detector would require the use of an amplifier having a wide dynamic range and a digital processing ability upon the processing of signals output from the detector and this makes the design of a front-end processing circuit difficult.

To obtain the same pulse-height for the sum of signals irrespective of which scintillator cell indeed emits light rays, there has been used an optical attenuation technique such as the replacement of a part of the light-reflecting material surrounding cells located in the proximity to the light-receiving element with a light-absorbing material (see, for instance, Document 3 as will be given later). However, this method suffers from a problem such that all of the abilities of resolving energy, position (depth of interaction) and time are deteriorated because of the reduction of the quantity of light capable of being utilized by the light-receiving element.

Document 1: Japanese Un-Examined Patent Publication Hei 1-229995

Document 2: Japanese Un-Examined Patent Publication Hei 11-142523

Document 3: IEEE, Nuclear Science, 1998, Vol. 45(3), pp. 1152–1157

SUMMARY OF THE INVENTION

Accordingly, it is an object of the present invention to provide a depth of interaction detector with uniform pulse-height as a radiation detector, which receives light rays on the end of a scintillator having a long and narrow shape and which is improved in the uniformity of energy information and position or depth of interaction information generated due to the dependence of the quantity of light received upon the distance between the light-emitting position (a light-emitting scintillator cell) and the light-receiving element.

It is a further object of the present invention to provide a depth of interaction detector with uniform pulse-height as a radiation detector, in which the difference in light collection efficiency between scintillator cells is reduced and the optical output of the light-receiving element is high even when radiation is absorbed by and emitted from a scintillator layer positioned above the scintillator layer optically coupled to the light-receiving element.

It is a still further object of the present invention to provide a depth of interaction detector with uniform pulse-height having a three-dimensional depth of interaction-detecting function and an energy information acquisition function independent of which scintillator cell practically emits light rays. The detector is excellent in the energy resolution capacity, it can provide, even when radiation is absorbed by and emitted from a scintillator layer positioned above the scintillator layer optically coupled to the light-receiving element, precise detected information with respect to the energy-position (or depth of interaction) with an accuracy identical to that observed for the lower part of the scintillator layers of the detector and it thus permits any compact arrangement of scintillator cells along the periphery of a torus.

It is a still another object of the present invention to provide a depth of interaction detector with uniform pulse-height, which is never accompanied by any deterioration of abilities of resolving energy, position (or depth of interaction) and time, unlike the optical attenuation technique such as those conventionally used.

According to the present invention, there have thus been provided a depth of interaction detector with uniform pulse-height as will be specified below:

1. A depth of interaction detector with uniform pulse-height, which comprises a multi-layer scintillator obtained by coupling at least two scintillator cells in a planar shape (or on a plane) and then stacking the planar coupled scintillator cells, in layers, up to at least two stages and a light-receiving element connected to the bottom face of each scintillator cell of this multi-layer scintillator, wherein the detector is provided with a means for discriminating the position of a scintillator cell, which receives radiant rays and emits light rays and a means for making, uniform, the quantity of the light emitted from each scintillator cell and received by the light-receiving element.

2. The depth of interaction detector with uniform pulse-height as set forth in the foregoing item 1, wherein the multi-layer scintillator is one obtained by coupling a plurality of scintillator cells arranged in a matrix of 2 to 3 columns and 2 to 3 rows on a plane and then stacking the resulting planar coupled scintillator cells, in layers, up to 3 to 5 stages.

3. The depth of interaction detector with uniform pulse-height as set forth in the foregoing item 1, wherein the multi-layer scintillator is one obtained by coupling 4 scintillator cells arranged in 2 columns and 2 rows on a plane and then stacking the resulting planar coupled scintillator cells in layers of four stages.
4. The depth of interaction detector with uniform pulse-height as set forth in any one of the foregoing items 1 to 3, wherein the means for discriminating the position of the scintillator cell, which absorbs radiant rays and emits light rays is one for discriminating or identifying the pulse shape of the light emitted from scintillator layers in the proximity to one another.
5. The depth of interaction detector with uniform pulse-height as set forth in the foregoing item 4, wherein the means for discriminating or identifying the pulse shape of the light emitted from scintillator layers in the proximity to one another is one which makes use of the difference in the attenuation-time coefficient for the emitted light.
6. The depth of interaction detector with uniform pulse-height as set forth in the foregoing item 5, wherein the difference in the attenuation-time coefficient is not less than 5 ns, preferably not less than 10 ns and more preferably not less than 20 ns.
7. The depth of interaction detector with uniform pulse-height as set forth in the foregoing item 6, wherein the scintillator is a cerium-doped $Gd_2SiO_5$ single crystal.
8. The depth of interaction detector with uniform pulse-height as set forth in any one of the foregoing items 1 to 7, wherein the means for making, uniform, the quantity of the light emitted from each scintillator cell and received by the light-receiving element is the roughened surfaces of the scintillator cells in the scintillator layer in the proximity to the uppermost scintillator layer; the mirror-finished surfaces of the scintillator cells in a scintillator layer other than those in the proximity to the uppermost scintillator layer; the disposition of a light-reflecting material between the scintillator cells in a scintillator layer other than the uppermost scintillator layer and the scintillator layers in the proximity thereto; and the disposition of a light-reflecting material on the outer surfaces of a scintillator cell free of any neighboring scintillator cell.
9. The depth of interaction detector with uniform pulse-height as set forth in any one of the foregoing items 1 to 8, wherein the boundaries between each pair of neighboring scintillator layers and the boundaries between each light-receiving element and the corresponding neighboring scintillator layers are filled with a light-permeable material transparent to the light rays emitted from the scintillator cell.
10. The depth of interaction detector with uniform pulse-height as set forth in any one of the foregoing items 1 to 9, wherein it comprises a multi-layer scintillator obtained by coupling 4 scintillator cells arranged in a matrix of 2 columns and 2 rows on a plane and then stacking the resulting planar coupled scintillator cells in layers of four stages and a light-receiving element connected to the bottom face of each scintillator cell of this multi-layer scintillator, wherein the scintillator is a cerium-doped $Gd_2SiO_5$ single crystal; wherein the doses of the cerium in the cerium-doped first and third scintillator layers are higher than those observed in the cerium-doped second and fourth scintillator layers and wherein the difference between the attenuation-time coefficients of these two kinds of scintillator layers is not less than 10 ns.
11. The depth of interaction detector with uniform pulse-height as set forth in the foregoing item 10, wherein the surfaces of the scintillator cells in the first, second and fourth scintillator layers are mirror-finished; the surface of the scintillator cells in the third scintillator layer are surface-roughened; light-reflecting materials are interposed between the scintillator cells in the first and second scintillator layers and on the outer surfaces of the scintillator cells; the boundaries between each neighboring scintillator layers and the boundaries between the light-receiving elements and the first scintillator layer are filled with silicone oil; the boundaries between the scintillator cells in the third and fourth scintillator layers are filled with air; the scintillator cells in the first and third scintillator layers are $Gd_2SiO_5$ single crystals each doped with 1.5 mole % of cerium; and the scintillator cells in the second and fourth scintillator layers are $Gd_2SiO_5$ single crystals each doped with 0.5 mole % of cerium.

DESCRIPTION OF THE PREFERRED EMBODIMENTS

Figure 1:
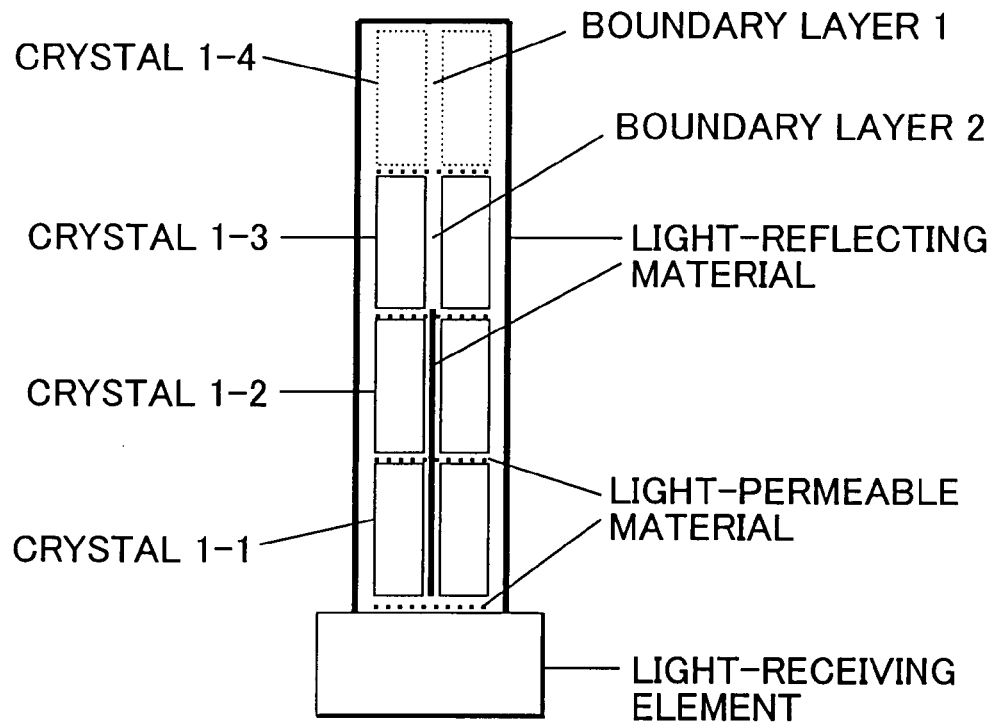
FIG. 1 is a diagram for the illustration of an embodiment of the depth of interaction detector with uniform pulse-height according to the present invention.

According to the present invention, a depth of interaction detector with uniform pulse-height excellent in the abilities of resolving energy, position (or depth of interaction) and time can thus be provided if a multi-layer scintillator is formed by coupling at least two, preferably at least four scintillator cells on a plane and then stacking a plurality of such planar, coupled scintillator cells in layers of at least two stages, preferably 3 to 5 stages and most preferably four stages; at least two light-receiving elements or those capable of resolving the depth of interaction are optically connected to the resulting multi-layer scintillator; the interstices (or boundaries) between every paired neighboring scintillator cells are filled with at least one member selected from the group consisting of air, light-reflecting materials, light-permeable materials and the same materials used for forming the foregoing scintillator; the optical surface conditions (mirror-finished or roughened surface) for each scintillator cell and the combination of such light-reflecting and light-permeable materials are optimized, to thus identify each specific scintillator cell, which detects radiant rays and to discriminate the radiation energy on the basis of the signals output from the light-receiving elements.

As the means for discriminating the position of a scintillator cell, which absorbs radiant rays and emits light rays used in the depth of interaction detector with uniform pulse-height according to the present invention, there can be listed, for instance, a means for discriminating the waveforms of the light rays emitted from the neighboring scintillator layers. Specific examples of such means for discriminating the waveforms of the light rays emitted from the neighboring scintillator layers include those, which make use of the difference between the attenuation-time coefficients for the emitted light rays. The difference between the attenuation-time coefficients is preferably not less than 5 ns, more preferably not less than 10 ns and most preferably not less than 15 ns.

The materials for the scintillator used in the depth of interaction detector according to the present invention are not restricted to specific ones inasmuch as they can absorb radiant rays and emit light rays, but specific examples thereof are cerium-doped GSO (Ce: $Gd_2SiO_5$), cerium-doped LSO (Ce: $Lu_2SiO_5$) and BGO ($Bi_4Ge_3O_{12}$). However, the higher the fluorescent output of the scintillator material, the greater the depth of interaction-discrimination effect of the resulting detector and therefore, the scintillator materials used in the present invention are desirably those showing an output of not less than 50% higher than that observed for $Bi_4Ge_3O_{12}$ and it is more desirable to use Ce: $Gd_2SiO_5$. The amount of cerium used for doping Ce: $Gd_2SiO_5$ preferably ranges from 0.1 to 5.0 mole % and is more preferably on the order of 0.5 to 1.5 mole %. The ability of discrimination between waveforms of neighboring two scintillator layers and hence the depth of interaction discrimination capacity can be improved if changing the fluorescent attenuation-time coefficient of the scintillator cell by adjusting the dose of cerium in the Ce: $Gd_2SiO_5$ single crystal. To this end, the difference in dose of cerium between the neighboring two scintillator layers is set at a level ranging from about 0.1 to 3.0 mole % to thus increase the difference between the attenuation-time coefficients to a level of not less than 5 ns, preferably not less than 10 ns and more preferably not less than 20 ns.

Each scintillator cell used herein is preferably one obtained by cutting a scintillator material (a single crystal) into a rectangular prism-like shape and the size thereof is suitably on the order of 1.0 to 10 mm×1.0 to 10 mm×10 to 50 mm.

As the means for making, uniform, the quantity of the light emitted from each scintillator cell and received by the light-receiving element, there may be listed, for instance, the roughened surfaces of the scintillator cells in a scintillator layer in the proximity to the uppermost scintillator layer; the mirror-finished surfaces of the scintillator cells in a scintillator layer other than those arranged in the proximity to the uppermost scintillator layer; the disposition of a light-reflecting material between the scintillator cells in a scintillator layer other than the uppermost scintillator layer and the scintillator layers in the proximity thereto; and the disposition of a light-reflecting material on the outer surfaces of a scintillator cell free of any neighboring scintillator cell.

Surfaces of a single crystal can be mirror-finished according to, for instance, a mechanical polishing method or a chemical polishing method.

Surfaces of a single crystal can be roughened by the use of, for instance, a cutting method or a coarse polishing method. The degree of surface-roughness suitably ranges from 346 nm (plane of cleavage) to 376 nm (plane of cleavage) as expressed in terms of the maximum height ($R_{max}$).

In addition, examples of the light-reflecting materials usable herein are metal foils (such as an aluminum foil), polymer films (such as a polytetrafluoroethylene film) and inorganic powdery substances. The thickness of these light-reflecting materials interposed between scintillator cells in general ranges from 10 to 500 µm and preferably 30 to 200 µm.

In the depth of interaction detector according to the present invention, it is desirable that the interstices between each pair of neighboring scintillator layers and each light-receiving element and the corresponding neighboring scintillator layer are filled with a light-permeable material transparent to the light rays emitted from the scintillator cell in order to make, uniform, the total quantity of light received by the light-receiving elements. Examples of such light-permeable materials transparent to the light rays emitted from the scintillator cell include silicone oil, air and transparent adhesives, with the silicone oil being preferred.

As has been discussed above in detail, each scintillator cell within a scintillator unit in the depth of interaction detector of the present invention can be controlled in its fluorescent attenuation-time coefficient by the adjustment of the content of impurities or the composition thereof and may be subjected to either a surface-roughening or mirror-finishing treatment arbitrarily selected. Moreover, an optically discrete layer may be formed as a boundary layer between cells and either a light-reflecting material or a light-permeable material (an optical coupling agent) transparent to the emitted light may be inserted into the interstices between the layers. As is disclosed in Japanese Un-Examined Patent Publication Hei 11-142523 in detail, the light rays generated in a certain scintillator cell are partially distributed to the neighboring scintillator cells in a certain rate through the boundary layers. The dispensed light rays thus received by neighboring scintillator cells are likewise distributed to the scintillator cells adjacent to the former ones in a certain rate and the same process described above successively take place between scintillator cells present in a scintillator unit and the light rays finally arrive at each light-receiving element coupled to the unit at one end thereof.

The quantity of light received by each light-receiving element is dependent upon the light-sharing rate observed between each pair of scintillator cells present in the foregoing scintillator unit and accordingly, if variously devising such light-sharing rates to thus variously combine the quantities of light rays received by each light-receiving element, it becomes possible to identify the scintillator cell just emitting light rays among those present in a scintillator unit and to thus measure the depth of interaction in the depth of interaction direction in the scintillator unit. At the same time, the optimization of the combination of the optical surface of a scintillator cell, light-reflecting and light-permeable materials to be used would permit the production of a depth of interaction detector with uniform pulse-height in which the total quantity of light rays received by all of the light-receiving elements is identical irrespective of which cell practically emits light rays, while allowing the discrimination of the depth of interaction.

Moreover, it is desirable in the present invention to use a highly sensitive light-receiving element such as one having a sensitivity of about 30% and one having a high light collection efficiency, in order to improve the discrimination of the depth of interaction.

EXAMPLE

The present invention will hereunder be described in more detail with reference to the accompanying drawings.

FIG. 1 is a diagram for the illustration of an embodiment of the depth of interaction detector with uniform pulse-height according to the present invention. In the depth of interaction detector with uniform pulse-height according to the present invention, scintillator cells are optically put on top of each other to form a four-layer scintillator and to thus form a scintillator unit as shown in FIG. 1. In this connection, a light-receiving element is optically coupled to each multi-layer scintillator at each end face of this scintillator unit and the external portions of the scintillator unit other than the end face are coated with a light-reflecting material (such as polytetrafluoroethylene) to a thickness (as determined after drying) of, for instance, 100 µm. Thus, the light rays generated within each scintillator cell are distributed to and arrive at these four light-receiving elements because of such a structure. The light-sharing rate may vary from scintillator cell to scintillator cell due to the difference in the optical path lengths from the light-emitting site (or the light-emitting scintillator cell) to the both ends because of the differences in the light transmittance and surface conditions between scintillator cells; the presence of a boundary layer or an optically discrete layer situated between scintillator cells; and the difference in fluorescence-emitting phenomenon between scintillator cells because of the difference in the composition or the impurity content between scintillator cells. For this reason, the specific scintillator cell just detecting radiant rays can be identified or one can obtain the information concerning the depth of interaction.

Figure 2:
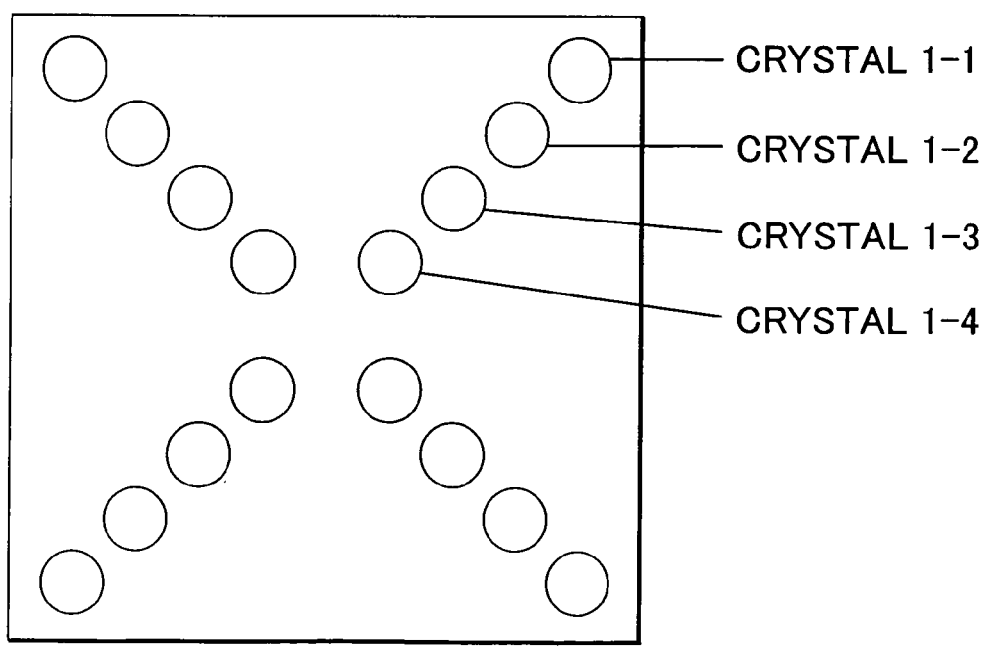
FIG. 2 is a diagram showing two-dimensional distribution of the sharing rates of the light rays received by four light-receiving elements of a depth of interaction detector with uniform pulse-height.
Figure 3:
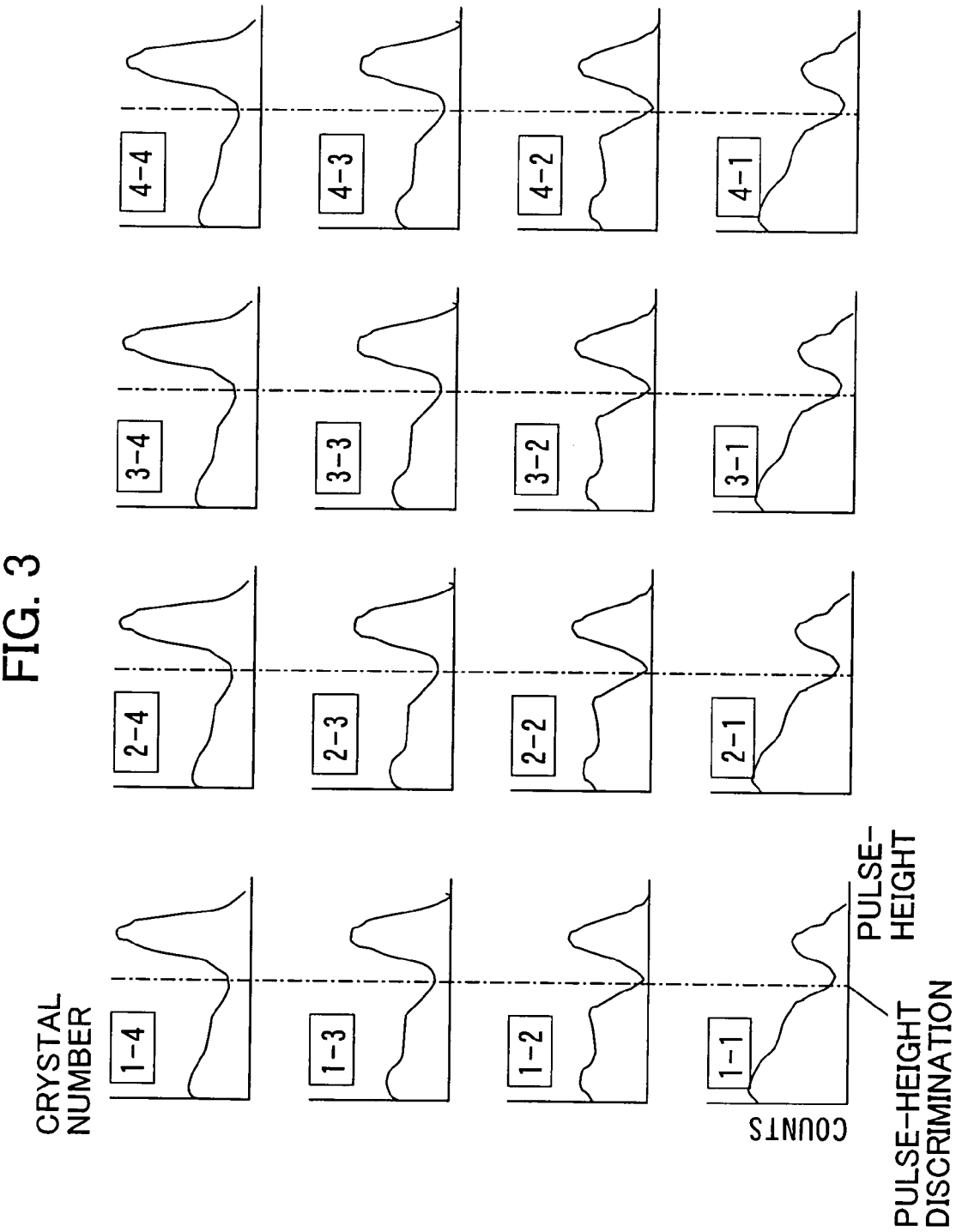
FIG. 3 is a distribution diagram observed for each scintillator cell with respect to the total quantity of light received by the light-receiving element of a depth of interaction detector with uniform pulse-height and the figure shows that these cells form pulse heights (abscissa) identical to one another with respect to γ-rays of a single wavelength.

FIG. 2 is a positioning image histogram or a two-dimensional diagram showing the light-sharing rates observed when preparing a scintillator unit by combining scintillator cells having the same fluorescent attenuation-time coefficient. In this respect, the one-to-one correspondence can be found between each region specified by a circle and the light emitted from a specific scintillator cell and therefore, the three-dimensional position or the depth of interaction of such a scintillator cell can be discriminated. When all of the scintillator cells have the same mirror-finished optical surfaces, regions specified by circles are superimposed on one another and this makes the depth of interaction-discrimination impossible, while if all of the scintillator cells have the same roughened optical surfaces, regions specified by circles are separated from one another and this makes the depth of interaction-discrimination possible. If all of the surfaces of these cells are roughened, however, the total quantity of light received by the light-receiving element is reduced as the distance from the light-emitting scintillator cell to the light-receiving element increases. Accordingly, the conditions of the optical surfaces of the scintillator cells in each layer as well as the combination of light-reflecting and light-permeable materials are adjusted and/or optimized in such a manner that all of the light-receiving elements receive the same total quantity of light rays for all of the light emission events of the scintillator cells, as will be seen from FIG. 3.

Figure 4:
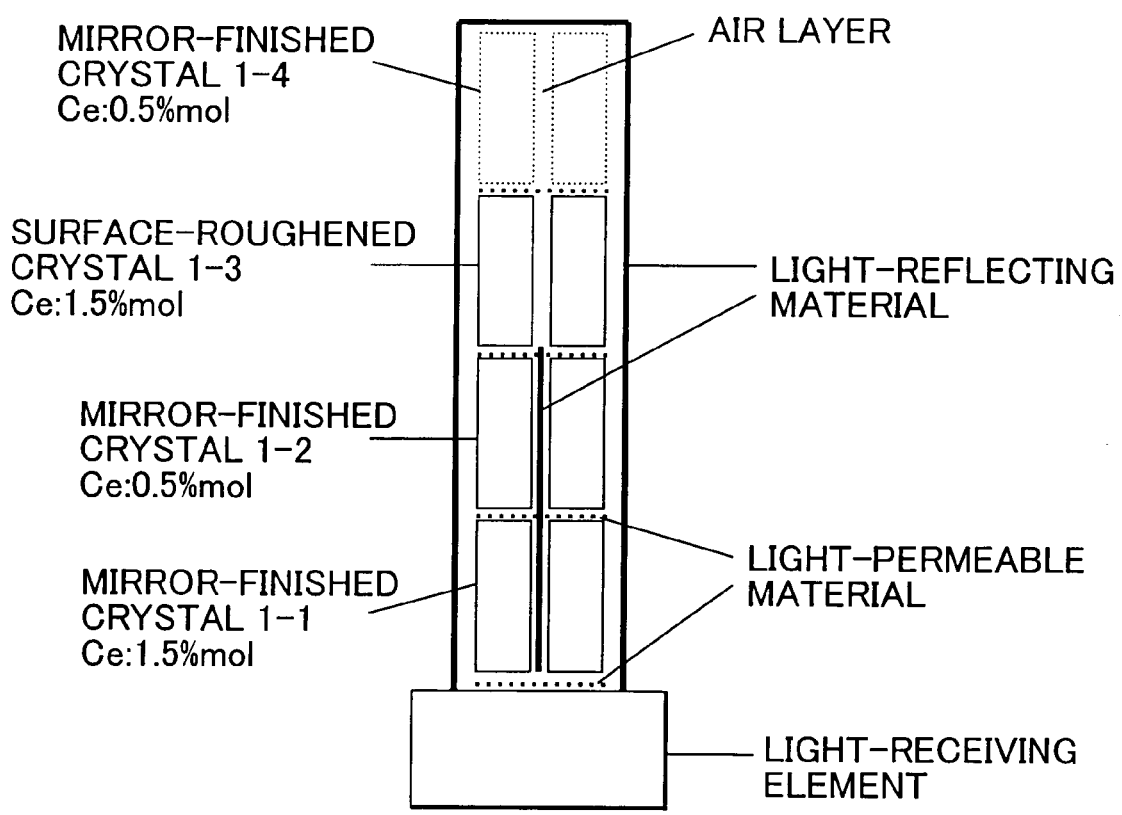
FIG. 4 is a diagram for illustrating an embodiment of the present invention and showing an example of the structure of the depth of interaction detector with uniform pulse-height according to the present invention.

FIG. 4 shows an embodiment of the scintillator unit of the present invention, which is formed by alternately coupling two kinds of cerium-doped GSO (Ce: $Gd_2SiO_5$)) crystals (hereunder referred to as GSO crystals; four crystals in all) having a rectangular prism-like shape and a size of 2.9 mm (length)×2.9 mm (width)×7.5 mm (height) along the longitudinal direction to thus give a four-layer scintillator and then optically coupling 4 such four-layer scintillators in a matrix (2 columns×2 rows). More specifically, a scintillator unit is formed in this embodiment by alternately putting, in layers, two kinds of GSO scintillator cells having different fluorescent attenuation-time coefficients (Ce concentration: 0.5 mole % (crystals 1-2 and 1-4) and 1.5 mole % (crystals 1-1 and 1-3)) to thus form a four-layer scintillator and then arranging 4 such four-layer scintillators in a matrix (2 columns×2 rows). In this respect, the fluorescent attenuation-time coefficients are 60 ns for the crystal having Ce concentration of 0.5 mole % and 35 ns for the crystal having Ce concentration of 1.5 mole %. In addition, a plurality of light-receiving elements (position-sensitive photomultiplier tubes) is connected to the lower end of the scintillator unit. In this embodiment, the light rays generated in each scintillator cell (cells 1-1 to 1-4; 16 cells in all) are distributed to 4 light-receiving elements. In this regard, however, a light-reflecting material is interposed between the scintillator cells in the scintillator layer 1 and those in the scintillator layer 2. For this reason, the scintillator cells in these two layers have a size of 2.9 mm (length)×2.9 mm (width)×7.5 mm (height), which is slightly smaller than those of the scintillator cells in the scintillator layers 3 and 4.

Figure 5:
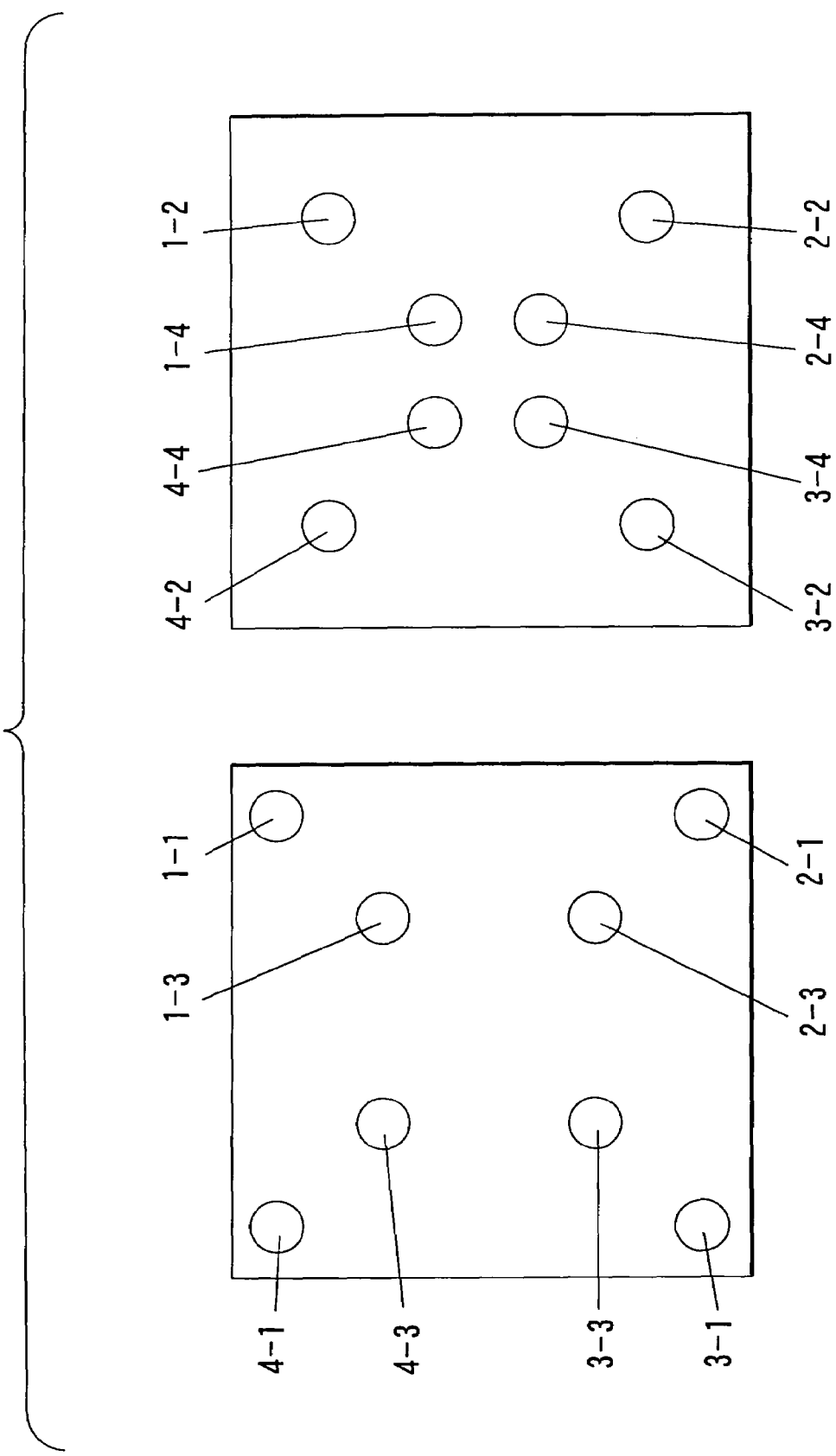
FIG. 5 is a diagram for illustrating an embodiment of the present invention and showing two-dimensional distribution of the sharing rate of the light rays received by four light-receiving elements of the depth of interaction detector with uniform pulse-height according to the present invention. The waveform (1) is a diagram showing two-dimensional distribution of the sharing rate of the light rays observed when the four light-receiving elements receive the light rays emitted by scintillator cells (four each) in the first and third scintillator cells and the waveform (2) is a diagram showing two-dimensional distribution of the sharing rate of the light rays observed when the four light-receiving elements receive the light rays emitted by scintillator cells (four each) in the second and fourth scintillator cells.

FIG. 5 is a diagram showing two-dimensional distribution of the light-sharing rates observed for this scintillator unit. More specifically, FIG. 5 shows diagrams each showing two-dimensional distribution of the light-sharing rates observed for each of two kinds of GSO scintillator cells having different fluorescent attenuation-time coefficients (60 ns and 35 ns). Each figure clearly indicates that the one-to-one correspondence is established between each region specified by a circle and the light emitted from a specific scintillator cell and therefore, it is easy to inhibit the occurrence of any superposition of regions specified by circles as compared with the scintillator unit comprising the combination of scintillator cells having the same fluorescent attenuation-time coefficient and this makes the depth of interaction-discrimination easy. The waveform 1 corresponds to the light emission observed for the crystals 1-1, 1-3, 2-1, 2-3, 3-1, 3-3, 4-1 and 4-3, while the waveform 2 corresponds to the light emission observed for the crystals 1-2, 1-4, 2-2, 2-4, 3-2, 3-4, 4-2 and 4-4.

Moreover, if all of the scintillator cells (GSO single crystals) have roughened optical surfaces, the total quantity of light emitted by each scintillator cell and received by the corresponding light-receiving element is greatly different from cell to cell, while if all of the scintillator cells (GSO single crystals) have the same mirror-finished optical surfaces, regions specified by circles in the two-dimensional distribution showing the light-sharing rates are superimposed on one another.

As will be seen from FIG. 4, in this embodiment, a scintillator layer 1 (scintillator cells 1-1, 2-1, 3-1 and 4-1), a scintillator layer 2 (scintillator cells 1-2, 2-2, 3-2 and 4-2) and a scintillator layer 4 (scintillator cells 1-4, 2-4, 3-4 and 4-4) have mirror-finished surfaces (treated according to the chemical polishing method); a scintillator layer 3 (scintillator cells 1-3, 2-3, 3-3 and 4-3) is surface-roughened (cut surfaces per se without any post treatment); a light-reflecting material (a layer of polytetrafluoroethylene) having a thickness of 100 μm) is applied to the boundaries between the scintillator cells in the scintillator layers 1 and 2 and the whole outer surface of the scintillator unit; the interstices between each pair of neighboring scintillator layers and between the scintillator layer 1 and the light-receiving elements are filled with silicone oil; and the interstices between the scintillator cells in the scintillator layers 3 and 4 are filled with air. When the scintillator unit has such a structure, regions specified by circles in the 2-dimensional distribution showing the light-sharing rates are separated from one another and the total quantities of light rays received by the individual light-receiving elements are almost identical to one another as shown in FIG. 6.

Figure 6:
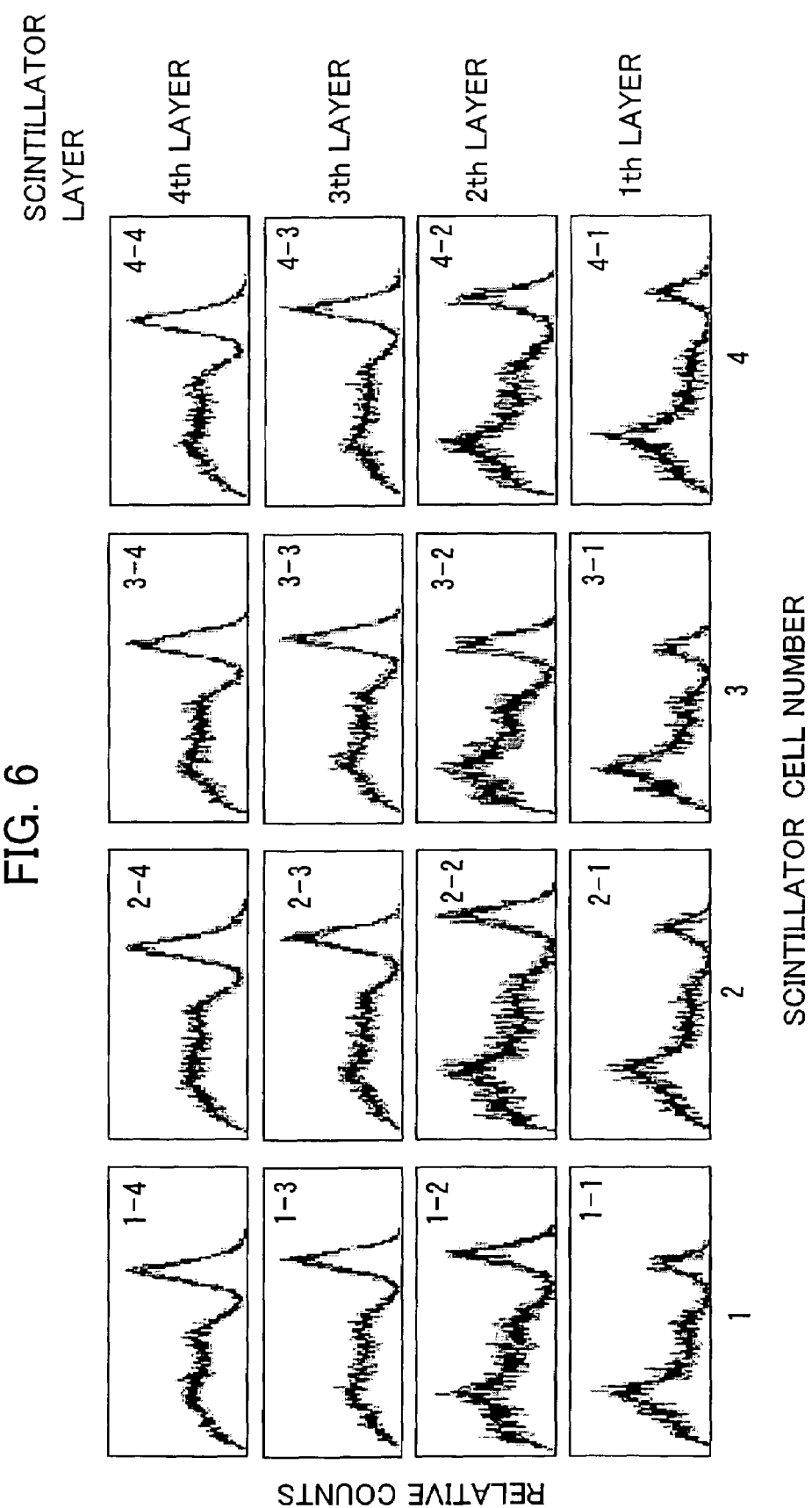
FIG. 6 is a distribution diagram for illustrating an embodiment of the present invention and observed for each scintillator cell (1—1 to 4—4) with respect to the total quantity of light received by the light-receiving elements of the depth of interaction detector with uniform pulse-height according to the present invention.
Figure 7:
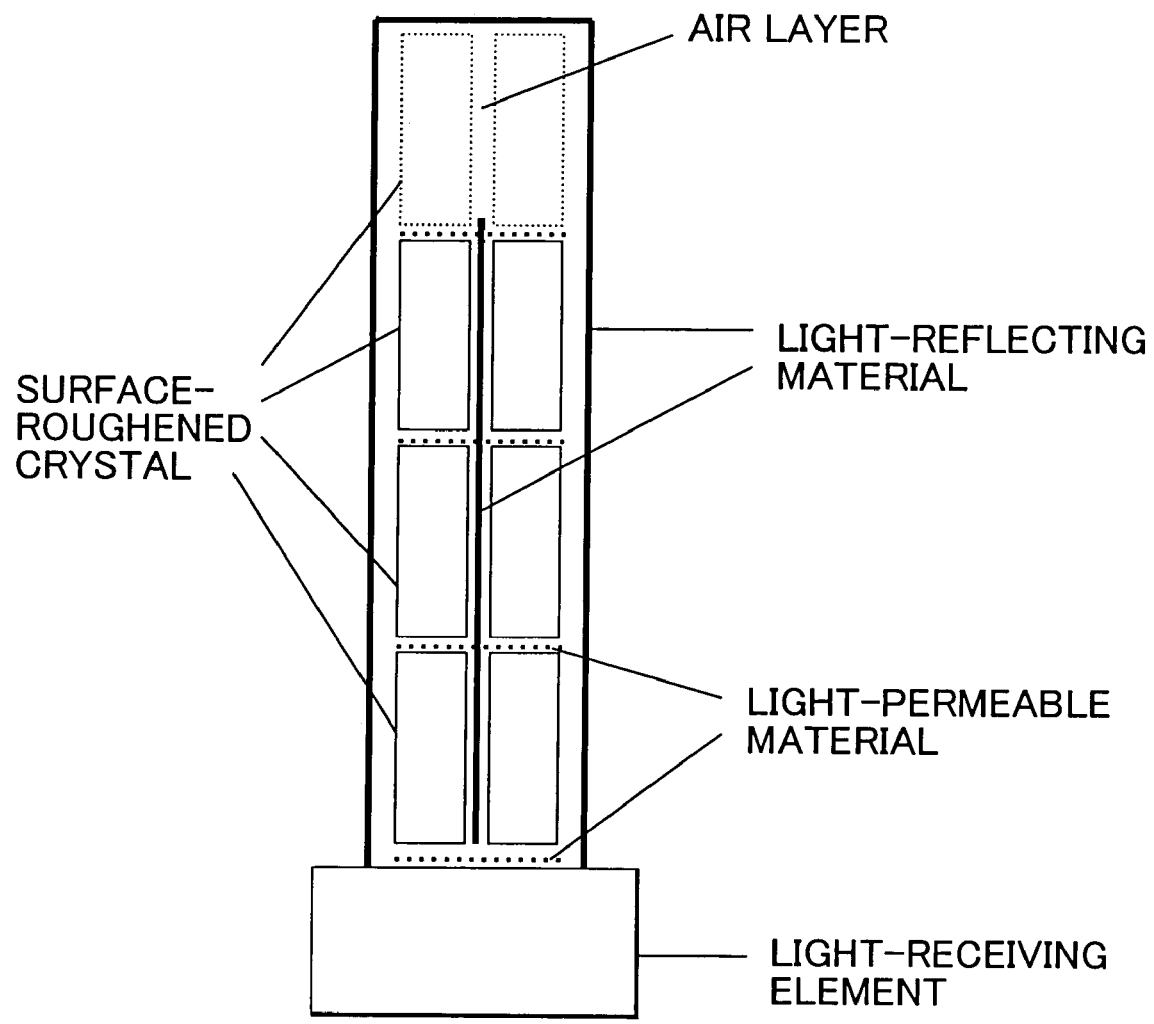
FIG. 7 is a diagram showing an embodiment (1) of the structure of a conventional depth of interaction detector.
Figure 8:
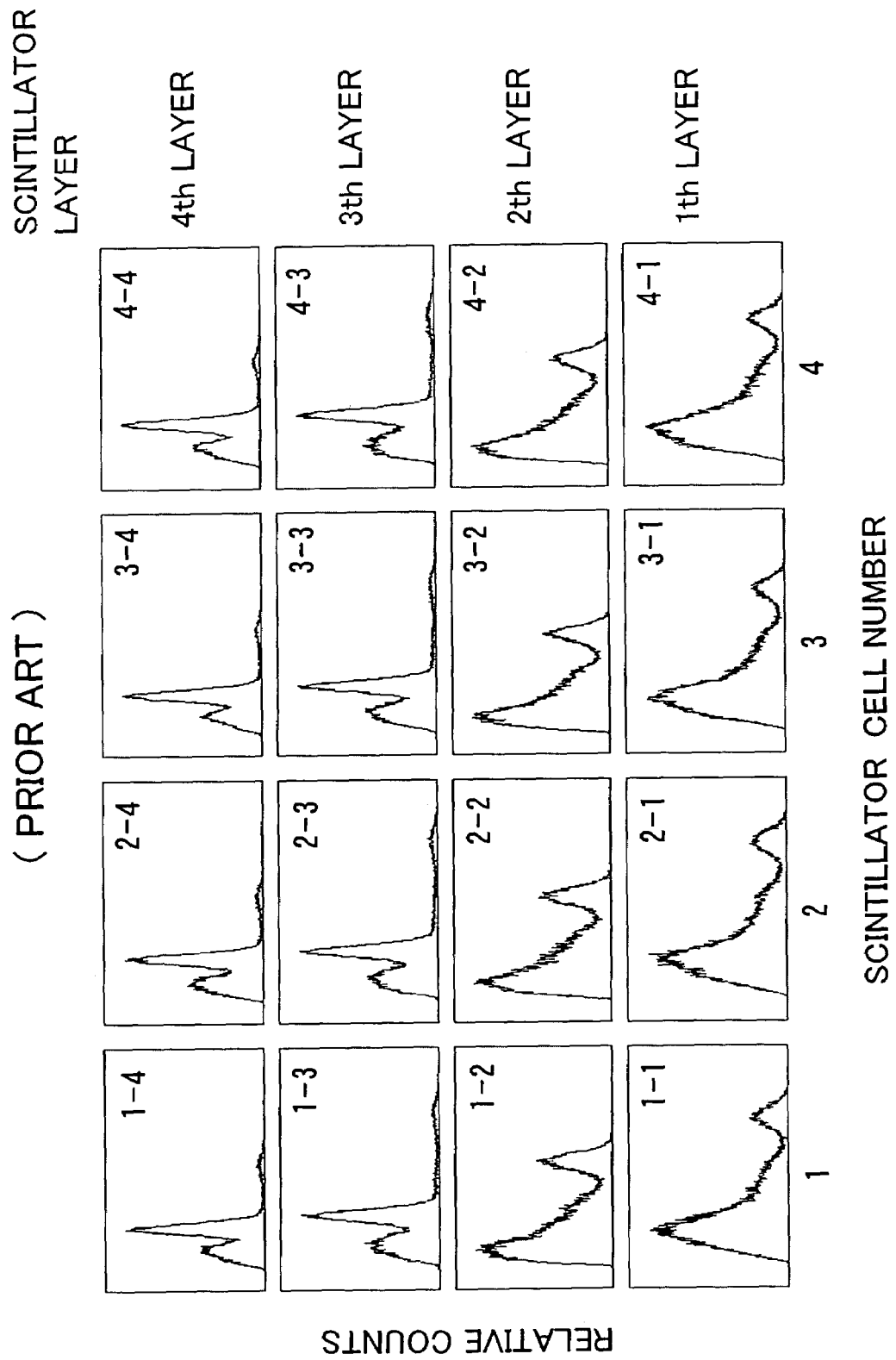
FIG. 8 is a distribution diagram observed for each scintillator cell with respect to the total quantity of light received by the light-receiving elements of a conventional depth of interaction detector (1).
Figure 9:
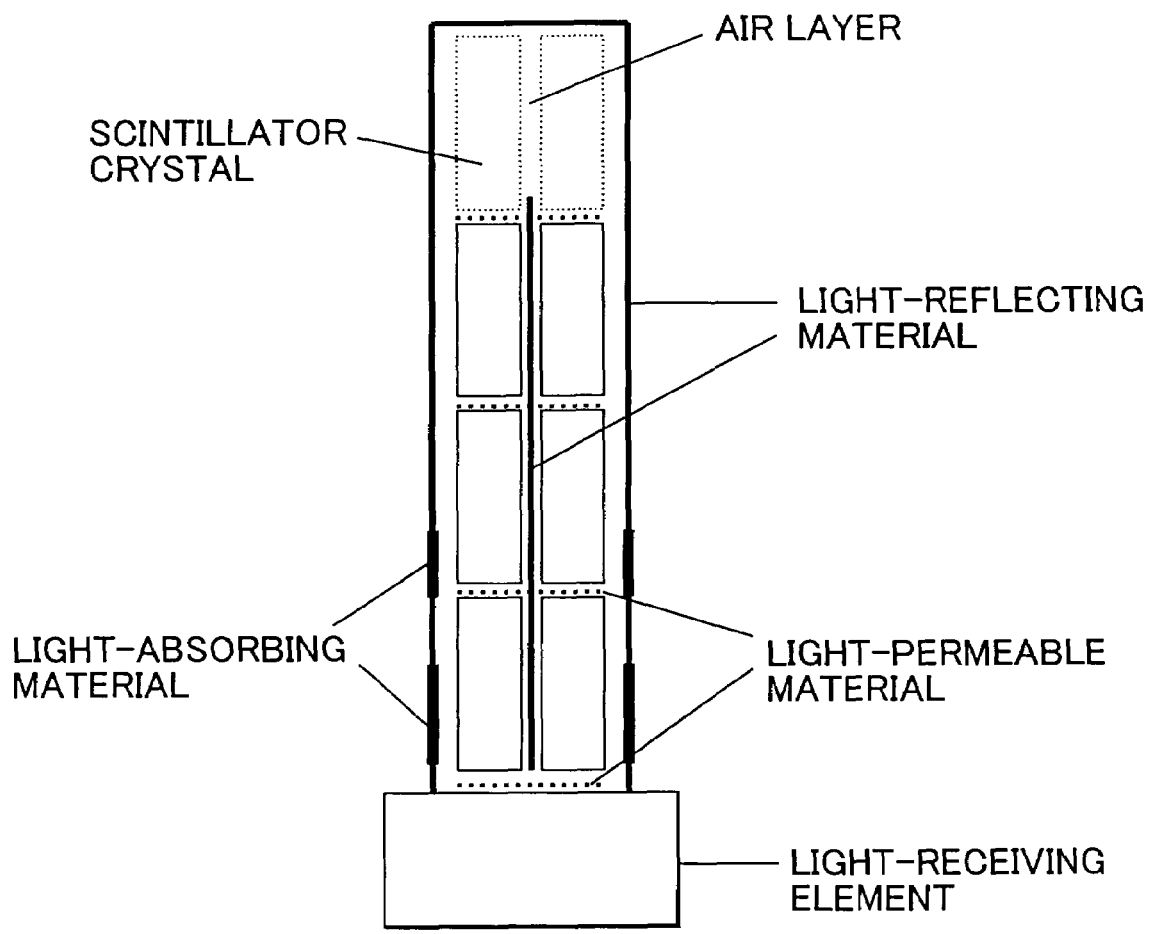
FIG. 9 is a diagram showing an embodiment (2) of the structure of a conventional depth of interaction detector with uniform pulse-height.

In FIG. 6, the relative counts of light emission are plotted as ordinate. In this test, the scintillator unit is irradiated with radiant rays of 511 eV emitted from $^{137}$Ce from the side of the scintillator layer 4. Accordingly, the highest relative counts are observed for the scintillator layer 4 and the lowest relative counts are observed for the scintillator layer 1. In FIG. 6, the pulse height (or the total quantity of light received by each corresponding light-receiving element) is plotted as abscissa. The position of the right hand side sharpest peak represents the total quantity of light (or the total quantity of the light energy received). The positions of peaks observed for the scintillator layers 1 to 4 are almost identical to one another and this accordingly indicates that each light-receiving element receives almost the same quantity of light energy irrespective of which scintillator cell among those in the scintillator layers 1 to 4 practically emits light rays.

EFFECTS OF THE INVENTION

The three-dimensional depth of interaction detector according to the present invention can provide precise detected information even when radiation is absorbed by and emitted from a scintillator layer positioned above the scintillator layer optically coupled to the light-receiving element, it permits the production of a depth of interaction detector having a three-dimensional depth of interaction-detecting function and it can provide the same total output signal, which is independent of the position or a specific scintillator cell practically emitting light if the radiation energy is identical. Since the detector never requires the use of any light-absorbing material unlike the conventional techniques, excellent abilities of resolving energy, position (or depth of interaction) and time of the detector would thus be ensured. The incorporation of the depth of interaction detector with uniform pulse height according to the present invention into a positron emission tomography (PET) would permit the analysis of the radiation energy information using only a single pulse height-analyzing circuit.

In the foregoing embodiment of the present invention, only Ce: $Gd_2SiO_5$ single crystal is used as the material for the scintillator, but the scintillator material usable in the hakama-shaped (Japanese skirt-shaped) depth of interaction detector according to the present invention is not restricted to Ce: $Gd_2SiO_5$ at all. In this respect, however, the higher the fluorescent output of the scintillator material used in the present invention, the better the effect attained. Therefore, it is desirable that the scintillator material is one having an output of not less than 50% higher than that observed for $Bi_4Ge_3O_{12}$ and it is more desirable to use Ce: $Gd_2SiO_5$.

Moreover, the foregoing embodiment of the present invention simply utilizes one or two kinds of scintillators having different fluorescent attenuation-times as the scintillator materials, but the present invention likewise includes an embodiment, which comprises a combination of at least three kinds of different scintillators. The use of scintillator materials having different fluorescent attenuation-times would permit the discrimination of the difference in fluorescent attenuation time on the basis of the waveform-discrimination. The present invention, therefore, permits the development of a depth of interaction detector in which the depth of interaction can be detected on the basis of the waveform-discrimination of output signals.

Preferred embodiments of the present invention will be described below:

1. A depth of interaction detector having a desired shape, which permits the collection of information on the detected depth of interaction and the discrimination of the radiation energy absorbed by the detector through the comparing and summing operations of a plurality of output signals.

2. A depth of interaction detector characterized in that at least two scintillator cells are coupled on a plane, that the planar, coupled scintillator cells are put in layers of at least two stages to form a multi-layer scintillator, that the boundaries between the scintillator cells are constituted by at least one member selected from the group consisting of air, light-reflecting materials, light-permeable materials and the foregoing materials for the scintillator, that the bottom face of the multi-layer scintillator is connected to at least two light-receiving elements or at least one light-receiving element capable of resolving position, and that the scintillator cell just emitting radiant rays is detected or identified and the radiation energy absorbed by the scintillator cells are discriminated on the basis of the signals output from the foregoing light-receiving elements.

3. The depth of interaction detector according to the foregoing embodiment 2, wherein the multi-layer scintillator is obtained using a plurality of scintillators having the same characteristic properties or having different fluorescent attenuation-time coefficients.

4. The depth of interaction detector according to the foregoing embodiment 2, wherein the multi-layer scintillator is obtained using a plurality of scintillators having different surface optical conditions.

5. The depth of interaction detector according to the foregoing embodiment 2, wherein the multi-layer scintillator comprises boundaries between the scintillator cells constituted by different layer groups of light-reflecting materials or light-permeable materials or air.

6. The depth of interaction detector according to the foregoing embodiment 2, wherein each layer group constituting the multi-layer scintillator comprises a plurality of scintillators having different optical surfaces.

7. The depth of interaction detector according to any one of the foregoing embodiments 2 to 6, wherein the scintillator cell just emitting light is identified on the basis of the ratios of the magnitudes of signals output from the light-receiving elements.

8. The depth of interaction detector according to any one of the foregoing embodiments 2 to 6, wherein the radiation energy detected by the scintillator cell is discriminated by the pulse-height discrimination on the basis of the summation of the signals output from the light-receiving elements.

9. The depth of interaction detector according to any one of the foregoing embodiments 2 to 6, wherein the scintillator cell just emitting light and the radiation energy absorbed by the scintillator cell are identified on the basis of the ratios of the magnitudes of signals output from the light-receiving elements and by the pulse-height discrimination on the basis of the summation of the signals output from the light-receiving elements.

10. The depth of interaction detector according to any one of the foregoing embodiments 2 to 9, wherein each scintillator cell has a rectangular prism-like shape.

11. The depth of interaction detector according to any one of the foregoing embodiments 2 to 10, wherein the quantity of light energy absorbed by the scintillator cell, which detects the radiation, can be subjected to output pulse-height discrimination under the same conditions irrespective of the identification of the light-emitting scintillator cell.

The invention claimed is:

1. A depth of interaction detector with uniform pulse-height, which comprises a multi-layer scintillator obtained by coupling at least two scintillator cells on a plane and then stacking the planar coupled scintillator cells, in layers, up to at least two stages and a light-receiving element connected to only the bottom face of each scintillator cell in the bottom layer of the stack of this multi-layer scintillator, wherein the detector is provided with a means for discriminating the position of a scintillator cell, which receives radiant rays and emits light rays and a means for making, uniform, the quantity of the light emitted from each scintillator cell and received by the light-receiving element.

2. The depth of interaction detector with uniform pulse-height as set forth in claim 1, wherein the multi-layer scintillator is one obtained by coupling a plurality of scintillator cells arranged in a matrix of 2 to 3 columns and 2 to 3 rows on a plane and then stacking the resulting planar coupled scintillator cells, in layers, up to 3 to 5 stages.

3. The depth of interaction detector with uniform pulse-height as set forth in claim 1, wherein the multi-layer scintillator is one obtained by coupling 4 scintillator cells arranged in a matrix of 2 columns and 2 rows on a plane and then stacking the resulting planar coupled scintillator cells in layers of four stages.

4. The depth of interaction detector with uniform pulse-height as set forth in any one of claims 1 to 3, wherein the means for discriminating the position of the scintillator cell, which absorbs radiant rays and emits light rays is one for discriminating or identifying the pulse shape of the light emitted from scintillator layers in the proximity to one another.

5. The depth of interaction detector with uniform pulse-height as set forth in claim 4, wherein the means for discriminating the pulse shape of the light emitted from scintillator layers in the proximity to one another is one which makes use of the difference in the attenuation-time coefficient for the emitted light.

6. The depth of interaction detector with uniform pulse-height as set forth in claim 5, wherein the difference in the attenuation-time coefficient is not less than 5 ns.

7. The depth of interaction detector with uniform pulse-height as set forth in claim 6, wherein the scintillator is a cerium-doped $Gd_2SiO_5$ single crystal.

8. The depth of interaction detector with uniform pulse-height as set forth in claim 4, wherein the means for making, uniform, the quantity of the light emitted from each scintillator cell and received by the light-receiving element is the roughened surfaces of the scintillator cells in the scintillator layer in the proximity to the uppermost scintillator layer; the mirror-finished surfaces of the scintillator cells in a scintillator layer other than those in the proximity to the uppermost scintillator layer; the disposition of a light-reflecting material between the scintillator cells in a scintillator layer other than the uppermost scintillator layer and the scintillator layers in the proximity thereto; and the disposition of a light-reflecting material on the outer surfaces of a scintillator cell free of any neighboring scintillator cell.

9. The depth of interaction detector with uniform pulse-height as set forth in claim 8, wherein it comprises a multi-layer scintillator obtained by coupling 4 scintillator cells arranged in a matrix of 2 columns and 2 rows on a plane and then stacking the resulting planar coupled scintillator cells in layers of four stages and a light-receiving element connected to the bottom face of each scintillator cell of this multi-layer scintillator, wherein the scintillator is a cerium-doped $Gd_2SiO_5$ single crystal; wherein the doses of the cerium in the cerium-doped first and third scintillator layers are higher than those observed in the cerium-doped second and fourth scintillator layers and wherein the difference between the attenuation-time coefficients of these two kinds of scintillator layers is not less than 10 ns.

10. The depth of interaction detector with uniform pulse-height as set forth in claim 9, wherein the surfaces of the scintillator cells in the first, second and fourth scintillator layers are mirror-finished; the surface of the scintillator cells in the third scintillator layer are surface-roughened; light-reflecting materials are interposed between the scintillator cells in the first and second scintillator layers and on the outer surfaces of the scintillator cells; the boundaries between each neighboring scintillator layers and the boundaries between the light-receiving elements and the first scintillator layer are filled with silicone oil; the boundaries between the scintillator cells in the third and fourth scintillator layers are filled with air; the scintillator cells in the first and third scintillator layers are $Gd_2SiO_5$ single crystals each doped with 1.5 mole % of cerium; and the scintillator cells in the second and fourth scintillator layers are $Gd_2SiO_5$ single crystals each doped with 0.5 mole % of cerium.

11. The depth of interaction detector with uniform pulse-height as set forth in claim 4, wherein the boundaries between each pair of neighboring scintillator layers and the boundaries between each light-receiving element and the corresponding neighboring scintillator layers are filled with a light-permeable material transparent to the light rays emitted from the scintillator cell.

12. The depth of interaction detector with uniform pulse-height as set forth in claim 11, wherein it comprises a multi-layer scintillator obtained by coupling 4 scintillator cells arranged in a matrix of 2 columns and 2 rows on a plane and then stacking the resulting planar coupled scintillator cells in layers of four stages and a light-receiving element connected to the bottom face of each scintillator cell of this multi-layer scintillator, wherein the scintillator is a cerium-doped $Gd_2SiO_5$ single crystal; wherein the doses of the cerium in the cerium-doped first and third scintillator layers are higher than those observed in the cerium-doped second and fourth scintillator layers and wherein the difference between the attenuation-time coefficients of these two kinds of scintillator layers is not less than 10 ns.

13. The depth of interaction detector with uniform pulse-height as set forth in claim 12, wherein the surfaces of the scintillator cells in the first, second and fourth scintillator layers are mirror-finished; the surface of the scintillator cells in the third scintillator layer are surface-roughened; light-reflecting materials are interposed between the scintillator cells in the first and second scintillator layers and on the outer surfaces of the scintillator cells; the boundaries between each neighboring scintillator layers and the boundaries between the light-receiving elements and the first scintillator layer are filled with silicone oil; the boundaries between the scintillator cells in the third and fourth scintillator layers are filled with air; the scintillator cells in the first and third scintillator layers are $Gd_2SiO_5$ single crystals each doped with 1.5 mole % of cerium; and the scintillator cells in the second and fourth scintillator layers are $Gd_2SiO_5$ single crystals each doped with 0.5 mole % of cerium.

* * * * *